(12) United States Patent
Säynevirta

(10) Patent No.: US 11,070,059 B2
(45) Date of Patent: Jul. 20, 2021

(54) FREQUENCY CONVERTER AND METHOD IN CONNECTION WITH A FREQUENCY CONVERTER

(71) Applicant: ABB Schweiz AG, Baden (CH)

(72) Inventor: Simo Säynevirta, Espoo (FI)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/445,662

(22) Filed: Jun. 19, 2019

(65) Prior Publication Data

US 2019/0393701 A1 Dec. 26, 2019

(30) Foreign Application Priority Data

Jun. 20, 2018 (EP) .................... 18178797

(51) Int. Cl.
*H02J 3/18* (2006.01)
*H02P 23/00* (2016.01)

(52) U.S. Cl.
CPC .......... *H02J 3/1892* (2013.01); *H02J 3/1842* (2013.01); *H02P 23/0004* (2013.01)

(58) Field of Classification Search
CPC .... H02J 3/1842; H02J 3/1892; H02P 23/0004
USPC ....................................................... 307/424
See application file for complete search history.

(56) References Cited

U.S. PATENT DOCUMENTS 10,677,219 B2 * 6/2020 Muszynski .............. H02J 3/46
2016/0091912 A1 3/2016 Stanlake

FOREIGN PATENT DOCUMENTS

EP 3101777 A1 12/2016
WO 2016139129 A1 9/2016

OTHER PUBLICATIONS

European Patent Office, Extended Search Report issued in corresponding Application No. 18178797.9, dated Jan. 7, 2019, 7 pp.
European Patent Office, Office Action issued in corresponding Application No. 18178797.9, dated Jun. 16, 2020, 6 pp.

* cited by examiner

*Primary Examiner* — Hal Kaplan
(74) *Attorney, Agent, or Firm* — Taft Stettinius & Hollister LLP

(57) ABSTRACT

A frequency converter and a method in a frequency converter. The frequency converter is adapted to drive an electrical load, wherein the frequency converter comprises a communications interface through which the frequency converter is adapted to receive external requests to change input power of the frequency converter, means adapted to hold one or more conditions for allowing to change the input power of the frequency converter, and processing means adapted to change the input power of the frequency converter upon receipt of the external request in the limits set by the one or more conditions. (FIG. 1)

20 Claims, 1 Drawing Sheet

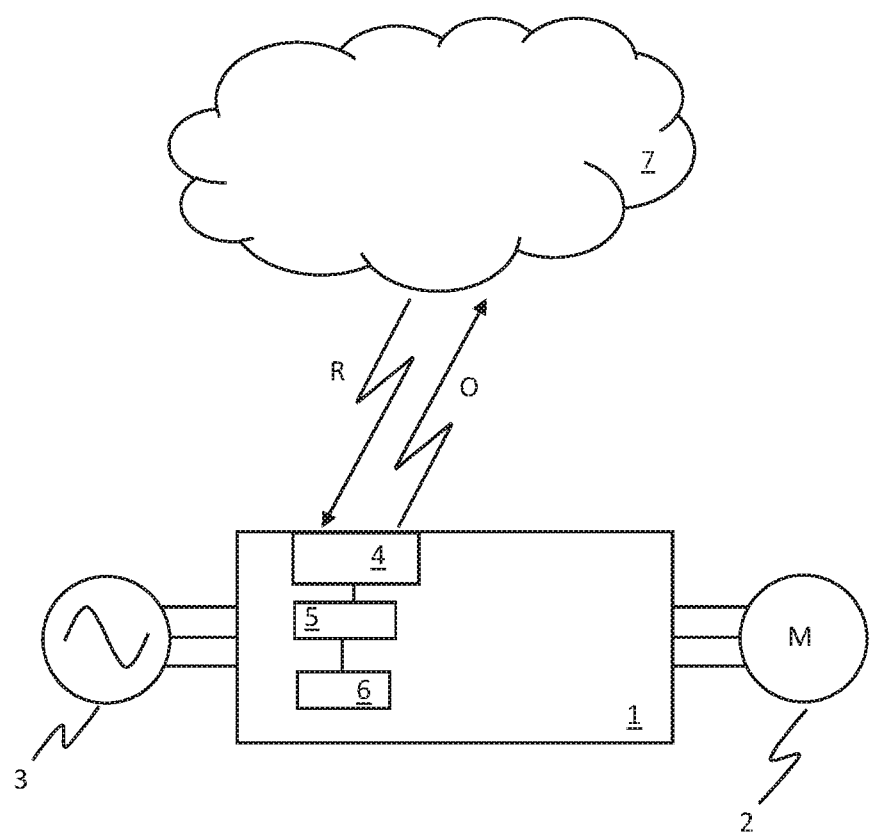

FREQUENCY CONVERTER AND METHOD IN CONNECTION WITH A FREQUENCY CONVERTER

FIELD OF THE INVENTION

The invention relates generally to frequency converters.

BACKGROUND OF THE INVENTION

Frequency converters are used in multiple of uses in industrial processes. Frequency converters are electrical devices, which produce variable frequency output voltage to a load. In a typical case, a frequency converter is connected to a grid or supply network with a fixed frequency and the frequency converter operates to rectify the voltage and form a variable frequency voltage to the load. The load is typically an electric motor which is driven with the frequency converter as required. The frequency converter may control the motor or load according to a speed reference or torque reference, for example. The references given to the frequency converter can be originated from the process in which the motor is involved or from the operator. For example, a frequency converter may be used for driving a blower motor for keeping a certain temperature within set limits. If the temperature is increased above the limit, the frequency converter will increase its output frequency to limit the temperature increase. In such a case the frequency converter is controlled based on a feedback obtained from a process. In certain cases the frequency converter may be controlled without feedback from the process. An example of such use is mixing or centrifuging where the operator instructs the frequency converter to operate according to specific rotational speed for a specific time without feedback from the mixing process.

Frequency converters are increasingly used in industrial processes due to their versatility of operation and due to energy savings obtained with controllability. The energy savings are obtained, for example, when a frequency converter is used for driving a pump in a process in which the flow is controlled. The flow can be controlled by throttling the flow using a valve while running the pump motor with a constant speed. However, energy is saved when the speed of the pump is controlled according to need instead of throttling the flow.

In known frequency converters the operation of frequency converters is dictated directly by the process or by the user. In order to further improve usage of energy on a larger scale, it would be beneficial to include further means of adapting the use of a frequency converter driving a load.

BRIEF DESCRIPTION OF THE INVENTION

An object of the present invention is to provide a method and a frequency converter for implementing the method so as to improve the usage of energy on a larger scale. The objects of the invention are achieved by a method and a frequency converter which are characterized by what is stated in the independent claims. The preferred embodiments of the invention are disclosed in the dependent claims.

The invention is based on the idea of using a frequency converter as a source of power capacity. A frequency converter may be in a use in which the power usage may be decreased, increased or postponed upon request. If the frequency converter releases capacity, i.e. uses less power, the amount of decreased power is usable somewhere else in the electrical network without needing to increase the overall supply of power.

An advantage of the method and device of the invention is that the production of electricity does not have to be increased each time power demand is increased. Additionally, the method and device of the invention enable to store excess energy of an electrical network to an industrial process. Further, the invention helps in sharing limited power capacity can be employed in increasing the quality of the electricity. The frequency converter of the invention can be configured to decrease or increase the power usage based on certain conditions. These conditions may depend on the process in which the frequency converter is used.

BRIEF DESCRIPTION OF THE DRAWINGS

In the following the invention will be described in greater detail by means of preferred embodiments with reference to the attached drawings, in which FIG. 1 shows a simplified block diagram of a frequency converter connected to a load.

DETAILED DESCRIPTION OF THE INVENTION

FIG. 1 shows an example of a block diagram of a frequency converter of the disclosure. FIG. 1 shows the frequency converter 1 connected to a three-phase motor 2. The frequency converter is supplied by an electrical network 3.

The frequency converter comprises a communications interface 4 through which the frequency converter is adapted to receive requests R to change input power of the frequency converter. The communications interface may be of any interface which allows to transmit an external request or signal to the frequency converter. The interface may be formed of wired or wireless transmission port which further transmit the external request to a processor or similar processing means 5 of the frequency converter. The communications interface of the frequency converter allows also to bi-directional communication such that the frequency converter is able to send offers O and other messages, such as acknowledgement messages through the communications interface.

The frequency converter further comprises memory 6 or similar means for storing information, which is adapted to hold one or more conditions for allowing to change the input power. Further, as mentioned, the frequency converter comprises also a processor, which is adapted to change the input power upon receipt of the external request in the limits set by the one or more conditions. The change of input power of the frequency converter is achieved in the invention by changing the output power. For example, the increased rotational speed of the load is achieved with increased output power. The increase of output power increases also the power taken from the electrical network, i.e. the input power of the frequency converter.

The one or more conditions are held in a memory 6 which stores some information or data set by a user. The memory is further accessible by the processor such that the processor may carry out calculations, comparison and other operations on the information or data. The user may input data or information which is used as the conditions which set the limits to the change of the output power which also affects the input power. The data or information can be inputted to the frequency converter by using input means, such as buttons, integrated to the frequency converter. The data or information can also be inputted using input means which are external to the frequency converter but are connected to the frequency converter either wirelessly or with a cable. The information or data can be, for example, inputted using a computer which has a specific software. The information or data which are used as the conditions may also be determined by the frequency converter itself. This may be accomplished for example with artificial intelligence or machine learning determining the .conditions through observation of the operating environment of the device itself.

The data or information used as the one or more conditions includes preferably information relating to the type of work the frequency converter is assigned to. The type of work may be, for example, stand-alone operation or dependent operation. In a stand-alone operation the frequency converter is operated independently, i.e. without any dependency to other frequency converters, for example. Further, in a stand-alone operation, the frequency converter controls the whole process in which the controlled load is. An example of a stand-alone operation is a pumping process in which the frequency converter drives a pump to fill a tank in a certain time after the level of liquid in the tank has reached a lower limit. In such a use, the frequency converter drives the pump to achieve a certain result within a certain time. In such use, it is likely that the frequency converter can operate the pump in multiple of ways to obtain the desired result. For example, the pump may be operated using maximal flow such that the container is filled as soon as possible and after the tank is filled, the frequency converter may be idle until the subsequent cycle. On the other hand, the frequency converter may calculate the time it has for the filling of the tank, and drive the pump such that the tank will be filled at the desired time instant.

In dependent operation, on the other hand, the use of the frequency converter is time critical, that is, the controlled action is required in real-time. An example of such use is, for example, a pumping process in which a certain flow is required. The required flow may be set by the process and the flow is obtained only by controlling the impeller of the pump to rotate at a certain rotational speed.

Further, the data or information which is used as the one or more conditions may comprise information on whether the rotational speed of the motor 2 can be decreased or increased. The decrease of the rotational speed of the motor typically increases duration of the process. If the process, however, is not time sensitive, the rotational speed may be lowered. The information set in the frequency converter may also comprise information or instructions that take into account the current state of the process. For example, the data set in the frequency converter may comprise rules, that when the rotational speed is above a certain speed, the speed may be lowered by a certain amount. Thus the data may include information on whether the rotational speed of the motor may be changed.

The data or the information which is used as one or more conditions may also comprise information when the current process has to be finished. That is, information of the process is set to the frequency converter. More specifically, information of the time instant when the ongoing process has to be completed. For example in a pumping process where a tank or a container is to be filled, information of the completion time is set to the frequency converter.

Generally, information whether or not the currently ongoing process can be postponed or slowed down is inputted to the frequency converter. Information regarding postponing the process requires typically information on when the process should be completed. If a process cannot be postponed but can be slowed down, then information regarding the lower limits are needed. For example, a certain process does not have to be run at the present speed but can be run with a lower speed. An example of such a process is a mixing process in which the mixing action has to be continuous and the mixed batch should be ready at a certain time. The lower speed which is allowable may be set as a percentage of the nominal rotational speed or as an absolute value of rotational speed.

The one or more conditions for allowing to change the input power may also be determined by the frequency converter from the state of the process using artificial intelligence or machine learning, for example. For example, the frequency converter may determine from gathered use history certain conditions relating to the process. For example, a frequency converter may notice that it is used for a certain period of time with a certain output power and then the output power is changed to another value. The frequency converter may assume that the operation will be continued in similar cycles. If further the frequency converter notices that the output torque is quadratically proportianal to the speed, it may determine that it is driving a pumping process. If the reference value for affecting the rotational speed is constant, then the frequency converter may determine, for example, that it is in a process which is used for filling a container.

The frequency converter of the invention receives a request R to change the input power to the communications interface 4 of the said frequency converter. The request is originated outside the frequency converter and outside the process in which the frequency converter is active. The request is originated, for example, from an operator of a large industrial plant in which the frequency converter is situated. The request may be sent due to increased power usage of the plant, and for balancing the use of power, the operator checks if the frequency converter can lower the input power of the frequency converter such that capacity is released to another use. In a large plant the request is sent to multiple frequency converters and each of the converters may receive the request.

The request may also be originated from an operator of a power network in which the power generation capacity is limited or where there is temporarily excess power to be consumed, for example originating from renewable, non-controllable energy sources. In such a case the change of the input power helps in keeping the power balance in condition. Further, the request may be originated from an operator of the network. The request may then be sent to large number of frequency converters.

According to an embodiment, the frequency converter is adapted to send external offers O if it determines that it is able and willing to change the input power. For example, if the frequency converter determines that the input power can be reduced, it sends an offer in which the amount of reduced power is indicated and the duration for which the output power can be reduced accompanied with the limit price of the offer and the duration for which the said offer is to remain valid. The offer is received, for example, by an operator or an entity 7 that governs the power balance in the network. After receiving the offer, the entity 7 may accept the offer and send a request to change the input power to the frequency converter. The operator or the entity governing the operation may accept the offer based on certain information sent together with the offer. The frequency converter may, for example, set a value or a price to the offer. If the entity or the operator accepts the offer, it sends a request to the frequency converter in which the offer is accepted. After the accepted offer, the frequency converter performs the operation which is agreed between the parties. Multiple frequency converters are connected similarly to the same entity which governs the balancing of the power. As the number may be large, considerable effects in power balancing can be obtained. The governing entity may receive multiple offers from the group of connected frequency converters, and the entity may accept any number of offers by responding with a corresponding request.

Frequency converters are in dynamical processes and the operational states and possibilities to join the balancing of the power by sending an offer change continuously. As the situations change continuously, the frequency converter typically changes the parameters of the offer, such as the unit price of the change, allowed duration of the change or the validity period of the offer. If the process or operational state is more costly, the value set by the frequency converter to the change of input power is also typically increased. As mentioned, the governing entity is free to choose any sent offer. The dynamically changing states mean that the value of the accepted offers also change depending on the offering.

The operation of the balancing of the power is carried out in real-time. The time period from the sent offer to the received request and performed change of output power may be in the range of milliseconds.

As the request for offer is received, the processor of the frequency converter reads the memory and checks from the data or information inputted to it, if the input power can be changed, i.e. if the held one or more conditions are met. In doing so, the processor first checks if the frequency converter is set to a mode in which it takes part in the changing of input power. The mentioned mode of the frequency converter is typically one of the conditions. If the frequency converter is in a time critical process, the user of the frequency converter may input data used in the conditions that the changing of the input power is not enabled. Thus when the frequency converter checks the criteria or conditions for taking part in the changing of input power, it notices that the changing, i.e. lowering or increasing of the input power, is either enabled or disabled by the user.

If the changing of the input power is enabled by the user or operator of the frequency converter, then the processor of the frequency converter checks whether the data or information inputted by the user and stored in the memory allows to change the input power, i.e. the frequency converter checks the one or more conditions. The data or information inputted and stored to the memory may contain a time requirement setting the time at which the process must be finished. In such a case, the frequency converter has stored the information of the duration of the process. Then, if a request is received when the frequency converter is producing output power, the processor of the frequency converter calculates if the process can be stopped and continued at a later time instant. Another alternative for the frequency converter is to calculate with how much lower output power the process can be completed in the required time. The input power may also be limited by the inputted data, which means that a lower limit is set for the output power or for the rotational speed of the motor controlled by the frequency converter. The output power of the frequency converter is the actually controlled power of the frequency converter, and the input power which is the power taken from the electrical network, follows the output power. The input power, i.e. the power taken from the electrical network, is of interest when considering the operation of the electrical network. The output power of the frequency converter and the losses in the frequency converter build together the input power.

The one or more conditions which limit the lowering of the input power may include, for example, a time instant when the present task has to be completed or amount of time the present task can be postponed.

For example, if the set conditions includes a time instant when the present task has to be completed, the frequency converter will lower the output power, and thereby the input power, if the task can be completed with a lower output power. Alternatively the frequency converter will stop the current task or process and lower the output power to zero, and continue the task or process to end at a later time instant so that the time requirement is met. If the frequency converter concludes that the output power cannot be lowered as the task cannot be completed in the required time, the frequency converter continues its operation.

Once the request is accepted and the frequency converter changes the output power to change the input power, the frequency converter preferably sends a confirmation to the sender of the request that the input power has been changed. Preferably, the frequency converter includes in the response the amount by which the input power is changed and an identification number or an identifier of the frequency converter.

The lowering of the output power is carried out preferably by decreasing the rotational speed of the electrical motor or the torque produced by the electrical motor. The processor of the frequency converter which determines that the output power can be lowered, acts to change internal reference values of the frequency converter such that the output power is reduced. The internal reference values may comprise current, voltage or torque references. The processor may send directly a reference value which overrides the reference used when the request was received. The processor may alternatively modify the used reference such that the reduced output power is obtained.

It is to be noted, that the frequency converter of the invention is not intended for saving energy. The frequency converter helps in optimizing the usage of power in a system where one or more producers and/or consumers of electricity have flexibility in the generation and use of power. With the frequency converter of the invention the use of power can be adjusted such that existing power capacity can be used efficiently.

In the method of the invention, a request to change the input power of the frequency converter is received in the frequency converter which is adapted to drive an electrical load. Further in the method, one or more conditions for allowing to change the output power of the frequency converter are held in the frequency converter. The method comprises further changing the output power of the frequency converter upon receipt of the external request in the limits set by the one or more conditions.

In the method of the invention, a request to change the input power is received outside the frequency converter as described above in connection with the frequency converter. The request is received in the frequency converter which holds one or more conditions for allowing to change the output power. The conditions are set in the frequency converter as data and information which may relate to the process or are user defined requirements.

Once the request is received and the frequency converter is operational in producing output power, the request is handled in the processor by checking whether or not the one or more conditions allow to change the output power.

The processor of the frequency converter operates to change the output power, and thereby the input power, if the one or more conditions allow to change the output power. The output power may be lowered by decreasing the rotational speed of the load, i.e. the electric motor and continuing the operation with a lowered rotational speed. Alternatively and depending on the set conditions the frequency converter may stop the present operation and continue it at a later stage. When the present operation is stopped, the output power is lowered to zero.

Preferably the frequency converter responds to the request by communicating an identifier of the frequency converter. Further, the frequency converter preferably transmits the amount of changed power in its response. In an embodiment of the method, the frequency converter change the input power by changing the rotational speed of the motor connected to the output of the frequency converter. The request to the frequency converter may be a request for lowering the input power. The lowering of input power is preferably carried out by decreasing the rotational speed of the motor controlled by the frequency converter.

In some situations it is desired that the consumed power in an electrical network is increased. For example when a large amount of renewable energy production is installed in the network the instantaneous production may exceed the demand of the power. In such a case the increase of consumption of power stabilizes the network. The increase of the input power of a frequency converter can be carried out for example by increasing the rotational speed of the load. Further, the procedure relating to increase of the input power is similar to that of the decreasing of the input power described above. The frequency converter may hold a condition which specifies that it is capable of increasing the output power. The frequency converter may send an offer indicating the capability of increasing the power, and the governing entity or operator may respond with a request. Further, as in connection with decreasing or lowering the output power, the procedure may also be initiated by the governing entity, i.e. when a frequency converter receives a request for offer.

When a frequency converter makes an offer and it is accepted and corresponding request to change the input power is made, the frequency converter may still make a confirmation, and the request to change the input power and the confirmation pair is to be treated as an agreement. The frequency converter has agreed to change the input power for a certain amount and time period and the governing entity or operator has agreed to provide compensation if a value is attached to the offer. Such request and confirmation pairs can be treated with digital contracts using cryptography and distributed ledger technology, for example. Another alternative is to use a centralized system with a database, for example, for holding the transactions or agreements. It is clear that multiple different procedures can be applied when making the agreement between the frequency converter and the governing body or operator. Generally, the governing body sends requests for offers for changing the input power of the frequency converter and the frequency converter responds by sending an offer. The procedure may further include confirmation messages after the requested and agreed change of input power has been performed.

In the above description, the change of the input power is considered as active power. However, the external request may also relate to reactive power. An electrical network requires certain amount of reactive power to operate properly. If it is noticed, that the amount of reactive power in a network should be changed, the frequency converter of the invention may be used for producing or consuming reactive power. The operation in connection with request relating to reactive power correspond to the above described operation in connection active power. Further, the external request may also relate to compensation of harmonic components of current. As known, frequency converters can be used for compensating harmonic currents. In connection with the compensation of harmonic current the external request may comprise the number of the harmonic which is to be compensated and the amount by which the compensation is carried out.

The external offers sent by the frequency converter may include further whether the frequency converter offers itself to change the input power to affect the real power, reactive power and/or to compensate the harmonic components.

In the above, the invention and its embodiments are described in connection with a frequency converter which is driving a rotating load. However, the invention can be embodied also in connection with a load which is static. For example, the load may consist of a battery of an electric car, for example. In connection with such battery, the frequency converter charge the battery, and depending on the conditions held in the frequency converter, may limit the charging of the battery upon receipt of external requests. Further, depending on the conditions the frequency converter may also feed power from the battery to the electrical network.

It will be obvious to a person skilled in the art that, as the technology advances, the inventive concept can be implemented in various ways. The invention and its embodiments are not limited to the examples described above but may vary within the scope of the claims.

The invention claimed is:

1. A frequency converter adapted to drive an electrical load, wherein the frequency converter comprises
   a communications interface through which the frequency converter is adapted to receive external requests to change input power of the frequency converter,
   means adapted to hold one or more conditions for allowing to change the input power of the frequency converter, and
   processing means adapted to change the input power of the frequency converter upon receipt of the external request in limits set by the one or more conditions.

2. A frequency converter according to claim 1, wherein the frequency converter is further adapted to send external offers relating to changing of input power through the communications interface.

3. The frequency converter according to claim 2, wherein the one or more conditions for allowing to change the input power include data or information relating to a process in which the frequency converter is used.

4. The frequency converter according to claim 2, wherein the one or more conditions for allowing to change the input power include time information relating to a process in which the frequency converter is used.

5. The frequency converter according to claim 1, wherein the one or more conditions for allowing to change the input power include data or information relating to a process in which the frequency converter is used.

6. The frequency converter according to claim 5, wherein the one or more conditions for allowing to change the input power include time information relating to the process.

7. The frequency converter according to claim 1, wherein the one or more conditions for allowing to change the input power include time information relating to a process in which the frequency converter is used.

8. The frequency converter according to claim 1, wherein the electrical load is a motor driven by the frequency converter and one or more conditions for allowing to change the input power include information of the amount the rotational speed of the electrical load can be changed.

9. The frequency converter according to claim 1, wherein one or more conditions for allowing to change the input power include information whether the input power can be increased.

10. The frequency converter according to claim 1, wherein one or more conditions for allowing to change the input power include information whether the input power can be decreased.

11. The frequency converter according to claim 1, wherein the frequency converter is adapted to change the input power by changing an output power.

12. A method for operating a frequency converter comprising,
receiving in the frequency converter an external request to change the input power of the frequency converter,
holding in the frequency converter one or more conditions for allowing to change the input power of the frequency converter, and
changing the input power of the frequency converter upon receipt of the external request in limits set by the one or more conditions.

13. The method according to claim 12, wherein the method comprises sending an external offer from the frequency converter relating to changing of input power, wherein the step of receiving an external request is carried out on the basis of the sent external offer.

14. The method according to claim 13, wherein the method comprises inputting the one or more conditions which are held in the frequency converter.

15. The method according to claim 13, wherein the method comprises forming in the frequency converter the one or more conditions which are held in the frequency converter.

16. The method according to claim 12, wherein the method comprises inputting the one or more conditions which are held in the frequency converter.

17. The method according to claim 16, wherein the method comprises forming in the frequency converter the one or more conditions which are held in the frequency converter.

18. The method according to claim 12, wherein the method comprises forming in the frequency converter the one or more conditions which are held in the frequency converter.

19. The method according to claim 12, wherein the changing of the input power comprises changing the rotational speed of the load of the frequency converter.

20. The method according to claim 13, wherein the changing of the input power comprises changing the rotational speed of the load of the frequency converter.

* * * * *